United States Patent
Bian et al.

(10) Patent No.: US 6,596,409 B2
(45) Date of Patent: *Jul. 22, 2003

(54) ONSET LAYER FOR THIN FILM DISK WITH COPTCRB ALLOY

(75) Inventors: Xiaoping Bian, San Jose, CA (US); Mary Frances Doerner, Santa Cruz, CA (US); Tim Minvielle, San Jose, CA (US); Mohammad Taghi Mirzamaani, San Jose, CA (US); Kai Tang, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/758,690

(22) Filed: Jan. 9, 2001

(65) Prior Publication Data

US 2001/0016272 A1 Aug. 23, 2001

Related U.S. Application Data

(63) Continuation-in-part of application No. 09/500,710, filed on Feb. 9, 2000.

(51) Int. Cl.$^7$ .............................. G11B 5/65; G11B 5/66
(52) U.S. Cl. .................. 428/611; 428/650; 428/668; 428/678; 428/65.6; 428/336; 428/694 TS; 428/614 TM; 204/192.2
(58) Field of Search ................ 428/65.3, 65.7, 428/332, 611, 663, 668, 900, 694 TS, 694 TM, 637, 650, 666, 667, 678, 65.6, 336; 204/192.2

(56) References Cited

U.S. PATENT DOCUMENTS

| | | | | |
|---|---|---|---|---|
| 5,605,733 A | * | 2/1997 | Ishikawa et al. | 428/65.3 |
| 5,693,426 A | | 12/1997 | Lee et al. | 428/611 |
| 5,700,593 A | * | 12/1997 | Okumura et al. | 428/694 TS |
| 5,736,262 A | * | 4/1998 | Ohkijima et al. | 428/611 |
| 5,789,056 A | * | 8/1998 | Bian et al. | 428/65.3 |
| 5,922,442 A | * | 7/1999 | Lal et al. | 428/216 |
| 5,995,472 A | * | 11/1999 | Fujii et al. | 369/110 |
| 6,010,795 A | * | 1/2000 | Chen et al. | 428/611 |
| 6,143,388 A | * | 11/2000 | Bian et al. | 360/128 |
| 6,150,015 A | * | 11/2000 | Bertero et al. | 428/332 |
| 6,156,404 A | * | 12/2000 | Ross et al. | 428/65.3 |
| 6,159,625 A | * | 12/2000 | Ueno | 428/694 T |
| 6,183,832 B1 | * | 2/2001 | Margulies et al. | 428/65.3 |
| 6,197,367 B1 | * | 3/2001 | Matsuda et al. | 427/127 |
| 6,383,667 B1 | * | 5/2002 | Futamoto et al. | 428/694 TS |
| 6,403,241 B1 | * | 6/2002 | Chen et al. | 428/694 TS |

OTHER PUBLICATIONS

Horner, I., Hall, N., Cornish, L. Witcomb, M, Cortie, M., and Boniface, T. (J.Alloys Cmpds, 264 (1998), 173).*

* cited by examiner

*Primary Examiner*—Paul Thibodeau
*Assistant Examiner*—Kevin M Bernatz
(74) *Attorney, Agent, or Firm*—Robert O. Guillot; IPLO Intellectual Property Law Offices

(57) ABSTRACT

The thin film disk includes a pre-seed layer of amorphous or nanocrystalline structure which may be CrTa or AlTi or AlTa, and that is deposited upon a disk substrate. The pre-seed layer is followed by the RuAl seed layer, a Cr alloy underlayer, an onset layer composed essentially of CoCr and a magnetic layer. The onset layer has an optimal concentration of 28–33 at. % Cr and an optimal thickness of 0.5 to 2.5 nm and it increases coercivity and improves the Signal-to-Noise Ratio (SNR) of the disk.

42 Claims, 6 Drawing Sheets

_US 6,596,409 B2_

ONSET LAYER FOR THIN FILM DISK WITH COPTCRB ALLOY

CROSS REFERENCE TO RELATED APPLICATIONS

This application is a continuation-in-part of U.S. patent application, Ser. No. 09/500,710, filed on Feb. 9, 2000, and entitled "NON-METALLIC THIN FILM MAGNETIC RECORDING DISK WITH PRE-SEED LAYER".

BACKGROUND OF THE INVENTION

The use of a RuAl seed layer, which is included in the preferred embodiment discussed below, is described in a commonly assigned, co-pending U.S. patent application with Ser. No. 09/295,267. The use of an onset layer, which is included in the preferred embodiment discussed below, is described in a commonly assigned, co-pending U.S. patent application with Ser. No. 08/976,565 entitled "Thin Film Disk with Onset Layer." U.S.P.T.O application Ser. No. 09/020,151, entitled "THIN FILM MAGNETIC DISK HAVING REACTIVE ELEMENT DOPED REFRACTORY METAL SEED LAYER" is mentioned below.

1. Field of the Invention

This invention relates generally to the field of thin film materials used in magnetic disks for data storage devices such as disk drives. More particularly the invention relates to the use of an improved onset layer in between an underlayer and magnetic layer on a thin film disk.

2. Background of the Invention

The magnetic recording disk in a conventional drive assembly typically consists of a substrate, an underlayer consisting of a thin film of chromium (Cr) or a Cr alloy, a cobalt-based magnetic alloy deposited on the underlayer, and a protective overcoat deposited on the magnetic layer. A variety of disk substrates such as NiP-coated AlMg, glass, glass ceramic, glassy carbon etc., are used. Disks that are commonly available in the market are made with an AlMg substrate on which a layer of amorphous NiP is electrolessly deposited. While a coating on the substrate is important because such a coating gives uniform magnetic read-back signals during the course of a disk revolution, the process of electroless deposition of NiP on an AlMg substrate has several disadvantages, one of them being the fact that electroless deposition is a wet process. The wet nature of the process necessitates that it be performed quite separately from the sputtering process by which the remainder of the layers in a magnetic recording disk is deposited. A NiP layer has other disadvantages too. For instance, with a NiP layer, it is difficult to achieve the smoothness and uniformity in the NiP surface of the magnetic recording disk, which is a prerequisite for the high densities required in current disk drives. Yet another problem associated with the NiP surface is corrosion. The NiP surface also tends to limit the processing temperatures because of its tendency to become magnetic if heated beyond a certain point.

Further, in cases where a non-metallic substrate such as glass is chosen, the conventional NiP coating is not preferable for use on glass as pre-seed layer for many reasons including those noted above. In such cases, the non-metallic substrate disks typically have a so called "seed layer" sputter deposited onto the substrate between the substrate and the Cr-alloy underlayer. The selection of the seed layer allows the performance of non-metallic substrates to exceed the magnetic recording characteristics of NiP/AlMg disks because the seed layer of the magnetic disk drive influences nucleation and growth of the underlayer which in turn affects the recording characteristics of the magnetic layer. Several materials have been proposed in published papers for seed layers such as: Al, Cr, CrNi, Ti, $Ni_3P$, MgO, Ta, C, W, Zr, AlN and NiAl on glass and non-metallic substrates. (See for example, "Seed Layer induced (002) crystallographic texture in NiAl underlayers," Lee, et al., J. Appl. Phys. 79(8), Apr. 15, 1996, p.4902ff). In a single magnetic layer disk, Laughlin, et al., have described use of a NiAl seed layer followed by a 2.5 nm thick Cr underlayer and a CoCrPt magnetic layer. The NiAl seed layer with the Cr underlayer was said to induce the [$10\bar{1}0$] texture in the magnetic layer. ("The Control and Characterization of the Crystallographic Texture of Longitudinal Thin Film Recording Media," IEEE Trans. Magnetic. 32(5) September 1996, 3632). In one of the related applications noted above, the use of RuAl for a seed layer is disclosed.

A Cr underlayer is mainly used to influence such microstructural parameters as the preferred orientation (PO) and grain size of the cobalt-based magnetic alloy forming the onset layer. When the Cr underlayer is deposited at elevated temperature on a NiP-coated AlMg substrate a [100] PO is usually formed. A PO of the underlayer promotes the epitaxial growth of [$11\bar{2}0$] PO of the hcp cobalt (Co) alloy forming the onset layer, thereby improving the in-plane magnetic performance of the disk for longitudinal recording. The [$11\bar{2}0$] PO refers to a film of hexagonal structure whose ($11\bar{2}0$) planes are predominantly parallel to the surface of the film. Since nucleation and growth of Cr or Cr alloy underlayers on glass and most non-metallic substrates differ significantly from those on NiP-coated AlMg substrates, different materials and layer structures are used on glass substrate disks to achieve optimum results.

The use of an onset layer has already been described in U.S. Pat. No. 5,736,262 in which a wide range of CoCr compositions were claimed including both ferromagnetic and non-magnetic alloys. The patent mentions that a non-magnetic onset layer is preferred because such a non-magnetic onset layer insures that the onset layer does not in any way contribute towards the magnetic properties of the disk. U.S. Pat. No. 5,922,442 specifies an onset layer with a defined saturation magnetization. However, the patent is silent about the desired Cr concentration of the onset layer. Since a magnetic layer of CoPtCrB alloy is difficult to grow epitaxially on a Cr alloy underlayer, there exists a need for an onset layer, which is conducive for the growth of magnetic layers.

The design of magnetic disks has advanced rapidly in recent years and, even 1 dB improvement in the Signal-to-Noise Ratio (SNR) is now considered quite significant. Recording density of magnetic disks as high as 30 to 40 gigabits per square inch has been achieved in the industry. However, this density has only been achieved in the laboratory and the density found in state of the art commercially available disk drives is far below this value. The density of a disk is also dependent on the thermal stability of the recorded information on the disk because a commercially viable disk drive must be capable of maintaining the stored information for periods of time measured in years.

SUMMARY OF INVENTION

The thin film disk of the invention includes a thin film pre-seed layer of amorphous or nanocrystalline structure. The pre-seed layer, which may be chromium-tantalum CrTa or aluminum-titanium (AlTi) or aluminum tantalum (AlTa) is deposited prior to a first crystalline layer. Although the pre-seed layer may be amorphous or nanocrystalline, for brevity it will be referred to herein as amorphous which is intended to encompass a nanocrystalline structure. In the preferred embodiment of the present invention, a pre-seed layer is sputtered onto a non-metallic substrate such as glass, followed by a ruthenium-aluminum (RuAl) seed layer with B2 structure. The use of the pre-seed layer improves grain size and its distribution, in-plane crystallographic orientation, coercivity (Hc) and SNR. In a preferred embodiment of the present invention, the pre-seed layer is followed by a RuAl seed layer, a Cr alloy underlayer, an onset layer and a magnetic layer. The amorphous pre-seed layer also allows use of a thinner RuAl seed layer which results in smaller overall grain size, as well as, a reduction in manufacturing cost due to relatively high cost of ruthenium. The increased coercivity also allows the use of a thinner Cr alloy underlayer, which also results in smaller overall grain size. Another benefit lies in the fact that the pre-seed layer provides additional thermal conductivity, which could help prevent thermal erasures on a glass disk. In accordance with a preferred embodiment of the present invention, an onset layer is used with an optimal concentration of Cr and an optimal thickness adapted to increase coercivity and improve the Signal-to-Noise Ratio (SNR).

DETAILED DESCRIPTION OF THE PREFERRED EMBODIMENT

Figure 1:
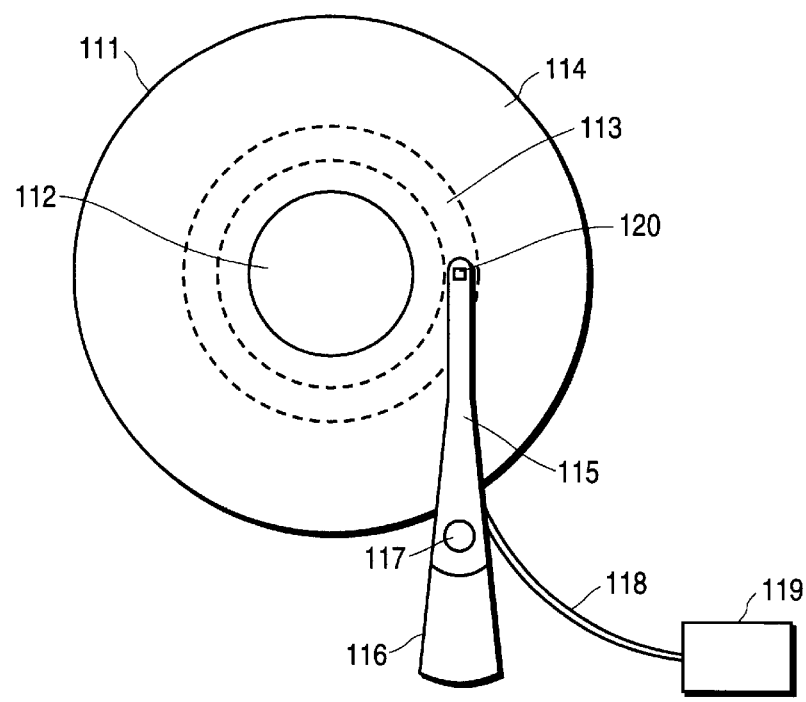
FIG. 1 is a top view of a disk drive illustrating the structural components of a disk drive with a rotary actuator as used in the present invention.

FIG. 1 is a top view illustrating a disk drive with a rotary actuator in which a thin film disk according to a preferred embodiment of the present invention may be used. The disk drive system includes one or more magnetic recording disks 111 mounted on a spindle 112, which is rotatable by an in-hub electrical motor (not shown). An actuator assembly 115 supports a slider 120, which contains one or more read/write heads. The actuator assembly 115 is composed of a plurality of actuators and sliders arranged in a vertical stack with the actuators supporting the sliders being in contact with the surfaces of the disks when the disks are not rotating or being unloaded to avoid contact. A voice coil motor (VCM) 116 moves the actuator assembly 115 relative to the disks by causing the assembly to pivot around a shaft 117. The read/write heads are typically contained in air bearing sliders adapted for flying above the surface of the disks when rotating at a sufficient speed. During the operation of the disk drive, if the sliders fly above the disks the VCM moves the sliders in an arcuate path across the disks so as to allow the heads to be positioned to read and write magnetic information from the circular tracks which are formed in the data area 114. The data area is coated with thin films as described below. Electrical signals to and from the heads and the VCM are carried by a flex cable 118 to drive electronics 119. When the disk drive is not operating and during such periods of time as when the rotation of the disks is either starting or stopping, the sliders may either be removed from the disks using load/unload ramps (not shown) or parked in physical contact with the surface of the disks in a landing zone or contact start/stop (CSS) area 113 which is not used for data storage even though the magnetic coating extends over this area. If the sliders are unloaded from the disks during non-operation, there is no need to have a CSS area and more of the disk becomes available for data storage. Although the disk drive has been described with air bearing sliders the disk of the present invention may easily be used in other storage devices having near contact, or contact recording sliders.

Figure 2:
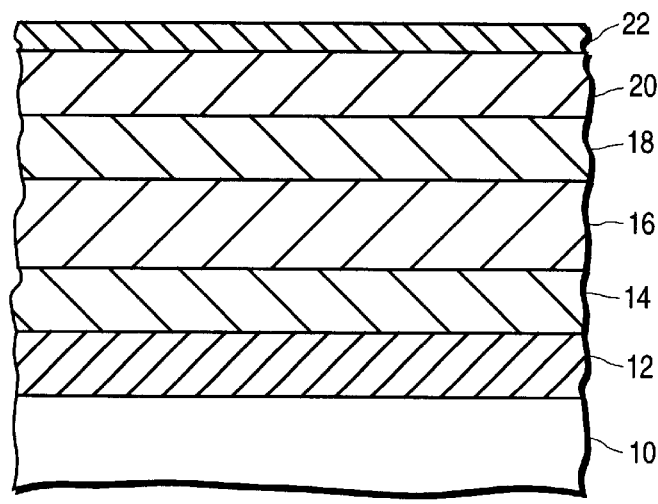
FIG. 2 is a diagram illustrating the layer structure of a thin film magnetic disk according to a preferred embodiment of the present invention.

FIG. 2 is a diagram illustrating the layer structure of a thin film magnetic disk according to a preferred embodiment of the present invention. The thin film layers are deposited onto at least one and preferably both planar surfaces of the magnetic disk to form the data recording area. The substrate 10 may be made of glass or any other suitable material.

A CrTa or AlTi or AlTa pre-seed layer 12 is first deposited onto the substrate. The pre-seed layer is deposited by conventional DC magnetron sputtering. The relative composition of Cr versus Ta is selected to produce a film with an amorphous or nanocrystalline structure. The use of a pre-seed layer improves the media coercivity for a film structure with very thin RuAl seed layer and ultra-thin Cr alloy underlayer.

The RuAl seed layer 14 is next deposited directly onto the pre-seed layer. The seed layer could also be a "double layer" with a layer of RuAl followed by a layer of NiAl, for example. This double layer configuration could result in cost savings by reducing the amount of Ru required. Ru is an expensive element, so a reduction in the required quantity of Ru will reduce the costs. In the double layer structure the RuAl seed layer establishes the grain size and orientation and the subsequently deposited NiAl follows the established patterns. An underlayer 16 is next deposited onto the seed layer and is comprised of a non-ferromagnetic material such as a chromium alloy e.g. CrV or CrTi. The underlayer is followed by a Co-alloy onset layer 18 and a CoPtCrB magnetic layer 20. The use of an onset layer 18 is described in a commonly assigned, co-pending U.S. patent application with Ser. No. 08/976,565. Typically, the onset layer material is selected in part for its lattice match with the underlayer. Lattice parameters, which are intermediate between that of the underlayer 16 and the magnetic layer 20 may strengthen the epitaxy in the desired orientation. In accordance with a preferred embodiment of the present invention, the onset layer 18 is of hexagonal close packed (hcp) structured material, which is ferromagnetic. Materials, which are suitable to form the onset layer, include cobalt-chromium alloys with Cr composition around 31 at. %. In accordance with a preferred embodiment of the present invention, the onset layer is between 0.5 to 2.5 nm thick.

A preferred embodiment of the present invention has a magnetic layer 20 deposited on the onset layer 18. The magnetic layer is an alloy of cobalt, which typically contains platinum and chromium and may contain additional elements such as tantalum or boron, e.g. CoPtCrTa or CoPtCrB. A typical magnetic layer might comprise 12 to 20 at. % platinum, 16 to 20 at. % chromium and 6 to 10 at. % boron with cobalt forming the remainder of the magnetic layer. The magnetic layer can be in the thickness range of 5–30 nm thick with 10–20 nm being the preferred thickness range. The use, composition and thickness of an overcoat 22 on top of the magnetic layer are not critical in practicing the invention, but a typical thin film disk might use an overcoat less than 15 nm thick.

While the compositions listed above have been given without regard to contamination percentages, it is known to those skilled in the art that some contamination is normally, if not always, present in thin films. Sputtering targets are typically specified as 99.9% or greater purity, but the resulting films may have much lower purity due to contamination in the sputtering chamber or other factors. For example, contamination by air in the chambers might result in measurable amounts of oxygen and/or hydrogen being incorporated into the film. It is also known that some small amount of oxygen is normally found in Cr targets and in the resulting Cr layer. It is also possible for small amounts of the working gas in the sputtering system, e.g. argon, to be incorporated into a sputtered film. Contamination levels were not specifically measured in the disk samples described and, therefore, were assumed to be within normal ranges for sputtered thin film disks expected by those skilled in the art.

The thin film disk made according to the invention can be used for storing data in typical disk drives using either magnetoresistive or inductive heads and can be used in contact recording or with flyable heads. The read/write head is positioned over the rotating disk in a standard manner to either record or read data.

In general, the application of some type of seed layer on glass and other alternate substrates to control nucleation and crystallographic orientation of Cr (or Cr alloys), and thereby the magnetic Co-alloy layer is well known. U.S. Pat. No. 5,789,056 disclosed that the use of a very thin seed layer and underlayer on glass media reduce the grain size of magnetic alloy substantially, thereby improving SNR. By applying different compositions of seed layers, crystallographically textured (112) or (100) Cr layer can be deposited. By sputtering Co-alloys on these Cr underlayers, textures of either ($10\bar{1}0$) or ($1\bar{1}20$) in the magnetic layer can be achieved. For high deposition rate sputtering, it has been found that the application of an amorphous TaN seed layer on glass induces a (100) orientation in the subsequently grown Cr underlayer, which promotes a strong ($1\bar{1}20$) orientation in the Co-alloy layer. (See U.S.P.T.O application Ser. No. 09/020,151, filed: Feb. 6, 1998, THIN FILM MAGNETIC DISK HAVING REACTIVE ELEMENT DOPED REFRACTORY METAL SEED LAYER). However, the formation of TaN layer requires a reactive atmosphere in the sputtering chamber and, therefore, increases the difficulty encountered during manufacturing. The ($1\bar{1}20$) texture of a Co-alloy layer can also be obtained by depositing a relatively thick RuAl seed layer, but the high cost of RuAl sputtering targets is a major drawback for its use in large scale manufacturing. The use of a CrTa pre-seed layer 12 allows the use of a very thin RuAl seed layer (and thus reduces cost) and an ultra-thin Cr (or Cr-alloys) underlayer on a glass substrate, which in turn enables the subsequent growth of strong ($1\bar{1}20$) oriented Co-alloy onset layer with controlled smaller grain size.

In accordance with a preferred embodiment of the present invention, the pre-seed layer 12 is sputter deposited onto a glass substrate 10 followed by a thin RuAl seed layer 14, an ultra-thin Cr-alloy underlayer 16, a Co-alloy onset layer 18 and a CoPtCrB magnetic layer 20. In order to enhance the lattice match between the RuAl seed layer 14 and the Cr-alloy underlayer 16, CrTi or CrMo alloys are preferred to form the underlayer. A CrMo underlayer is also advantageous because it helps render the SNR less sensitive to changes in the underlayer thickness. Magnetic properties and SNR data for disks with and without a CrTa and AlTi pre-seed layer are listed in Table-1 for a comparison.

TABLE 1

| | Disk Structure | Hc (Oe) | Mrt | S* | SoNR (dB) |
|---|---|---|---|---|---|
| 1 | $RuAl_{50}/CrTi_{10}/CoCr_{37}/CoPt_{11}Cr_{20}B_7$ | 3040 | 0.375 | 0.66 | 27.6 |
| 2 | $CrTa_{50}/RuAl_{50}/CrTi_{10}/CoCr_{37}/CoPt_{11}Cr_{20}B_7$ | 3660 | 0.420 | 0.80 | 27.7 |
| 3 | $NiAl_{50}/CrV_{20}/CoCr_{37}/CoPt_{10}Cr_{20}B_6$ | 3400 | 0.420 | 0.78 | 26.4 |
| 4 | $AlTi_{50}/RuAl_{50}/CrTi_{10}/CoCr_{37}/CoPt_{11}Cr_{20}B_7$ | 3500 | 0.430 | 0.81 | 27.7 |

The data in table 1 shows that although disks 1 and 2 have a comparable SoNR, disk 2 with a $CrTa_{50}$, i.e., 50 at. % Ta, pre-seed layer exhibits a substantially higher Hc and coercive squareness S*. At the same Mrt (remanent magnetization times thickness) as disk 3, disk 2 gives rise to a SoNR improvement of 1.3 dB as compared to the $NaAl_{50}$ seed layer structure of disk 3. Disk 4, which was made with an $AlTi_{50}$ pre-seed layer, also shows an improved performance over the prior art $NiAl_{50}$ (disk 3). The high coercivity and squareness achieved with CrTa and AlTi pre-seed layers is a result of creating the enhanced RuAl <100> and in-plane Co <$1\bar{1}20$> textures.

Figure 3:
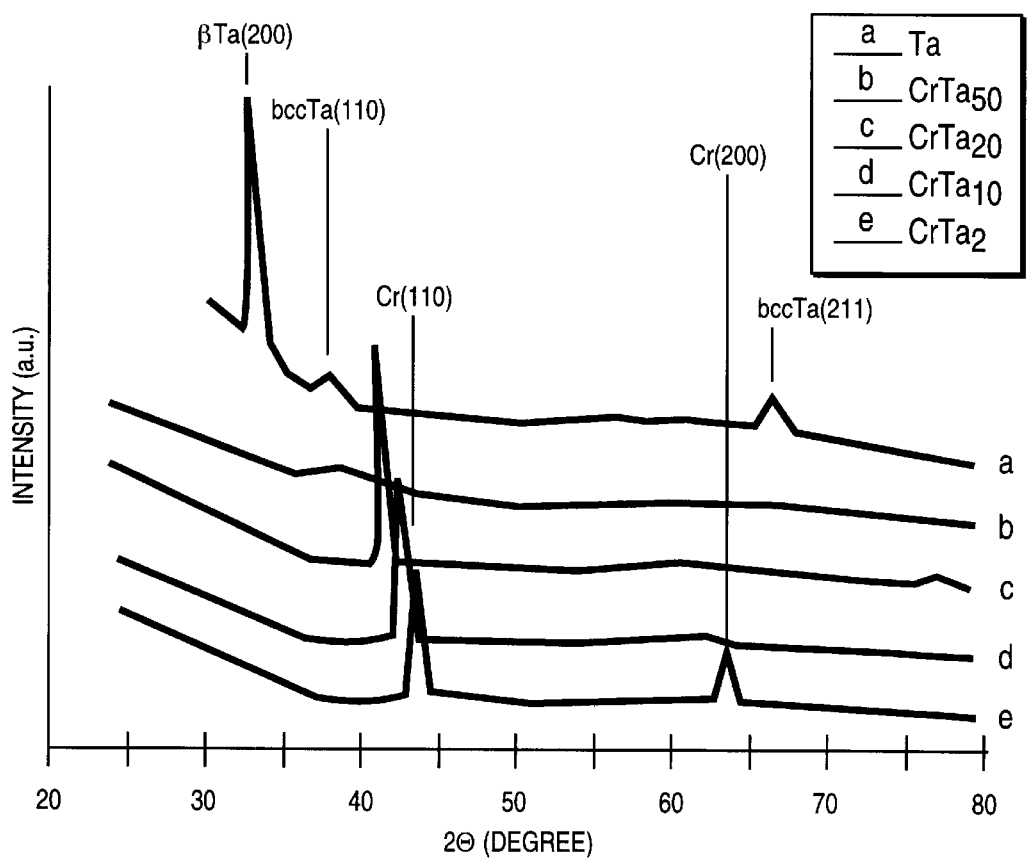
FIG. 3 is a graph illustrating the x-ray diffraction data for various samples of a magnetic disk drive showing the structural variations of CrTa with changes in composition.

FIG. 3 is a graph illustrating the X-ray diffraction data for various samples of a magnetic disk drive showing the structural variations of CrTa with different changes in composition. The figure shows spectra for a set of film structures with $CrTa_{50}$, $CrTa_{20}$, $CrTa_{10}$, $CrTa_2$ and Ta only pre-seed layers. No significant peaks appear for the $CrTa_{50}$ film indicating that this composition results in a substantially amorphous or nanocrystalline film. Both the pure Ta and $CrTa_{20}$ films result in significant diffraction peaks indicating crystalline structure.

Figure 4:
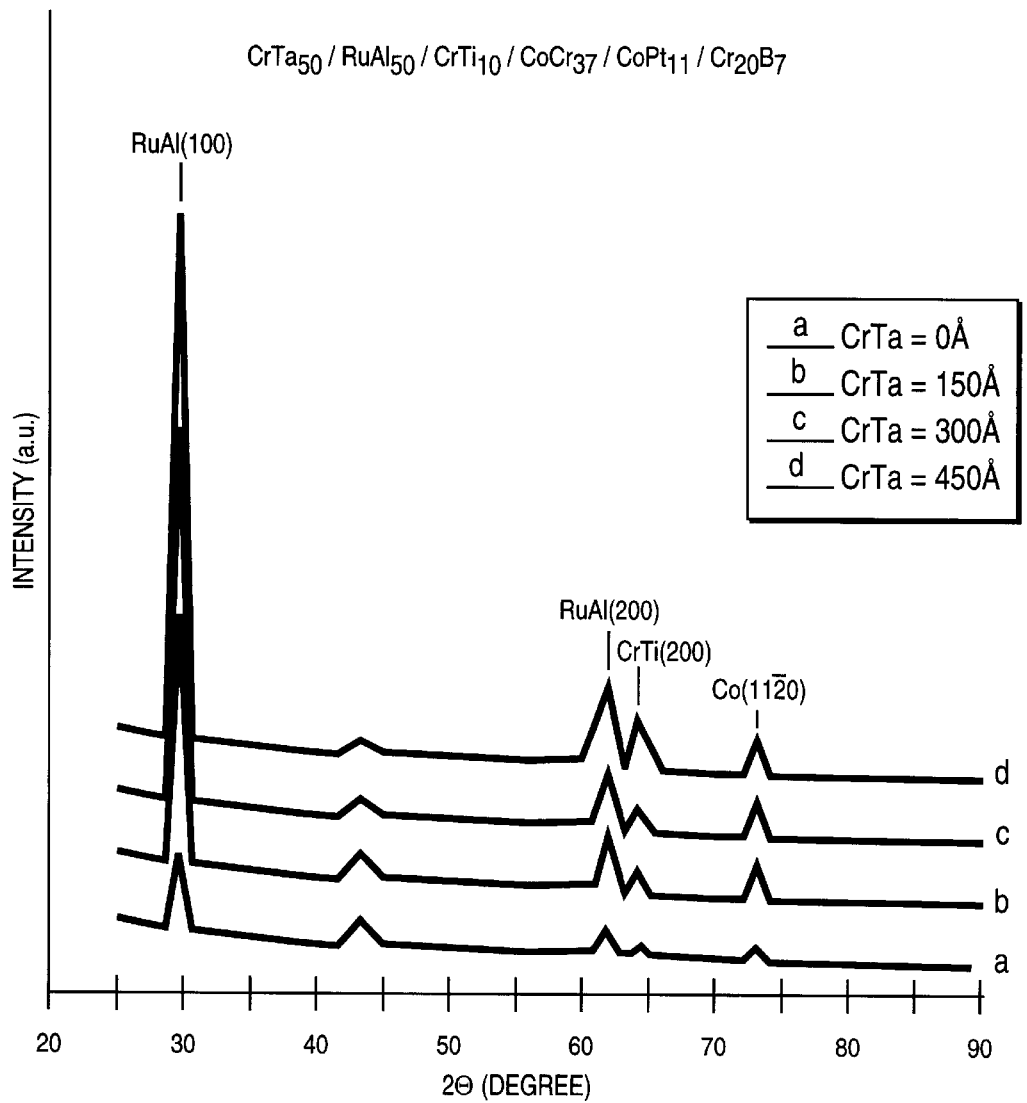
FIG. 4 is a graphical illustration showing x-ray diffraction data for samples of thin film magnetic disks showing the structural variations of materials with changes in thickness of a $CrTa_{50}$ pre-seed layer according to the invention.

FIG. 4 is a graphical illustration showing X-ray diffraction data for samples of thin film disks made with varying thickness of $CrTa_{50}$ pre-seed layers ranging from 0 to 45 nm. The results are consistent up to a thickness of 60 nm. Throughout the X-ray spectra no crystalline CrTa diffraction peaks are observed, thus confirming the amorphous nature of the pre-seed layer. As is known to those of ordinary skill in the art, the use of RuAl seed layer on glass substrate creates a Cr <200> texture which leads to a <$1\bar{1}20$> texture in the Co-alloy layer. For a structure without the CrTa pre-seed layer, all the diffraction peak intensities are very weak, indicating poor structural integrity due to the deposition of very thin RuAl seed layer and CrTi underlayer directly on glass. By depositing a CrTa pre-seed layer, substantial enhancements of RuAl (100), (200), CrTi (200) and Co-alloy ($1\bar{1}20$) diffraction peaks are observed, indicating a significant improvement of the C-axis in-plane orientation.

Figure 5:
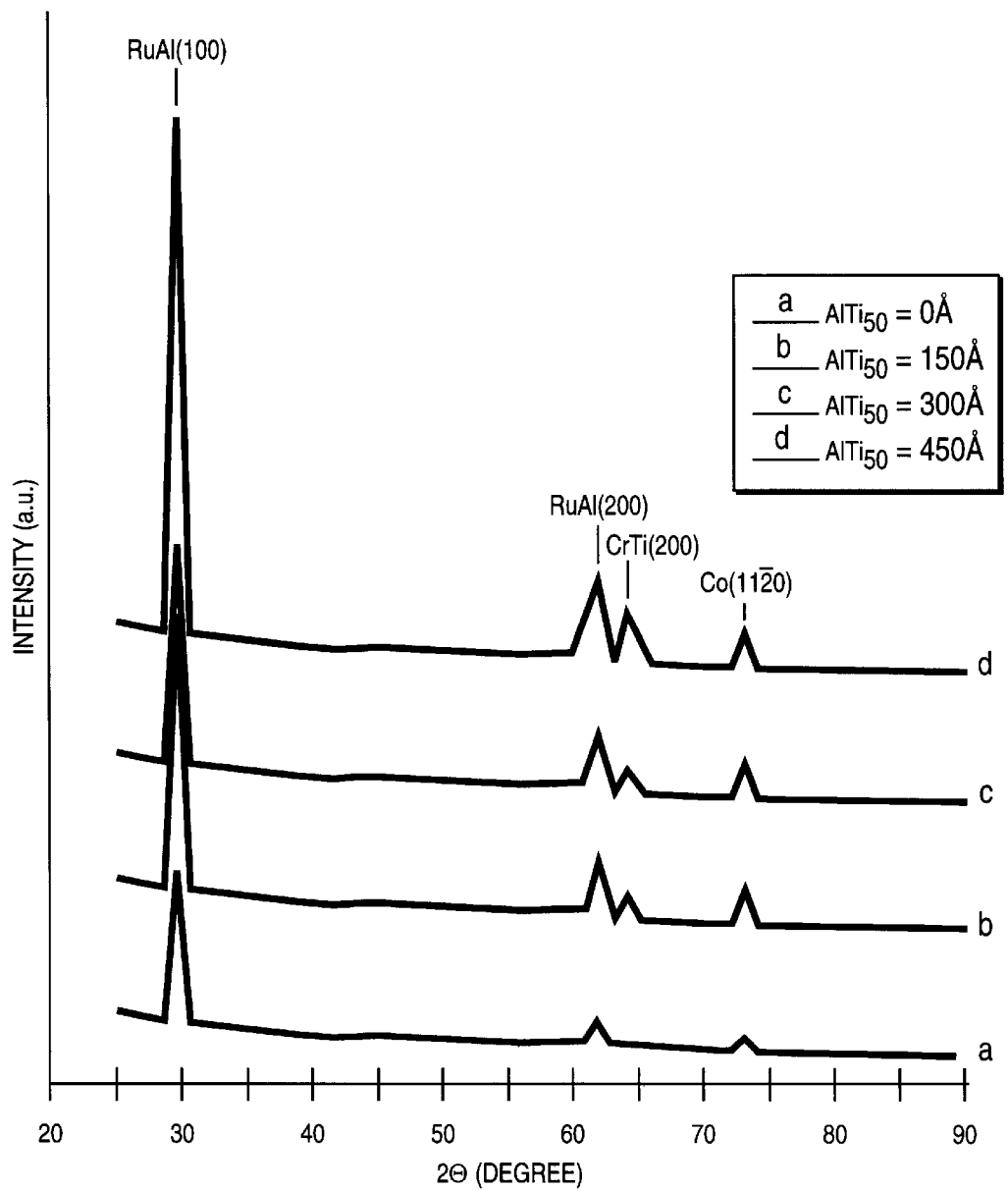
FIG. 5 is a graphical illustration showing x-ray diffraction data for samples of thin film magnetic disks showing the structural variations of the materials with changes in thickness of a $AlTi_{50}$ thin film layer according to a preferred embodiment of the present invention.

FIG. 5 shows X-ray diffraction plots for disks made with 0, 150, 300 and 450 Angstroms of thicknesses of $AlTi_{50}$ pre-seed layers. The results are believed to be valid down to a thickness of 100 Angstroms (A), i.e. 10 nm. The disks had RuAl seed layers, CrTi underlayers and cobalt alloy magnetic layers. The graph shows that the preferred orientations of RuAl (100), RuAl (200), CrTi (200) and Co ($1\bar{1}20$) strengthen with increased thickness of the AlTi pre-seed layer. As shown in FIG. 3 the preferred composition for the CrTa pre-seed layer is $CrTa_{50}$. The behavior of AlTi is similar to CrTa in this respect, so the preferred composition for an AlTi is also 50–50.

Table 2 summarizes the values of full width half-maximum (FWHM) derived from the RuAl (200) and Co ($1\bar{1}20$) peaks. It is clear that the much smaller FWHM values are measured for the film structure with either $CrTa_{50}$ or $AlTi_{50}$ pre-seed layers. The smaller FWHM values indicate a high degree of in-plane texture and less dispersion of [$1\bar{1}20$] preferred orientation of the hexagonal Co structure.

TABLE 2

| Film structure | RuAl (200) (°FWHM) | Co($1\bar{1}20$) (°FWHM) |
|---|---|---|
| $RuAl_{50}/CrTi_{10}/CoCr/CoPtCrB$ | 17.6 | 12.8 |
| $CrTa_{50}/RuAl_{50}/CrTi_{10}/CoCr/CoPtCrB$ | 5.8 | 5.2 |
| $AlTi_{50}/RuAl_{50}/CrTi_{10}/CoCr/CoPtCrB$ | 8.7 | 6.8 |
| $AlTa_{20}/RuAl_{50}/CrTi_{10}/CoCr/CoPtCrB$ | 11.6 | 8.8 |

It is also known that the poor thermal conductivity of glass substrates can cause the recorded data bits to be thermally erased. The use of a relatively thick CrTa pre-seed layer could potentially have some advantage in addressing the thermal erasure issue related to a glass disk medium.

Use of sputtered NiP pre-seed layer together with a Cr sub-seed layer and a NiAl seed layer was published by Chen, Yen, Ristau, Ranjan. ("Effect of Cr sub-seed layer thickness on the crystallographic orientation of Co-alloy recording media on glass," IEEE Trans. Magn. 35, pp. 2637–2639 (1999). Their results showed that ($1\bar{1}20$) Co-alloy texture can be generated for thicker (>45 Å) Cr sub-seed layers, but the SNR was poor due to larger grain size. For thin Cr sub-seed layers, the use of the NiAl seed layer induces (1 $0\bar{1}0$) Co-alloy texture.

RuAl tends to form the B2 (cesium chloride) structure in a sputtered thin film. Small amounts of other materials could conceivably be added to RuAl without disrupting the critical B2 structure. The B2 structure is an ordered cubic structure that can be described as two interpenetrating simple cubic lattices where, for RuAl, Al atoms occupy one lattice and Ru atoms the other. RuAl has a lattice constant, which is close to that of Cr even though Cr has a bcc structure. RuAl tends to form smaller grain size than Cr due to the strong bonding between the Ru and Al atoms, which reduces atomic mobility during deposition.

The role of the RuAl seed layer of the preferred embodiment of invention is to ultimately control the orientation, grain size and grain size distribution of magnetic grains. The grain size and orientation achieved in a RuAl seed layer is propagated into the magnetic layer through epitaxial growth of properly selected subsequent layers including the magnetic layer. Whereas the traditional thin film magnetic disk has only three layers e.g., underlayer, magnetic layer and overcoat, the trend in the industry is towards using additional layers. The terminology for these additional layers has not become standardized, but in a descriptive sense, there may be pre-seed layers 12, seed layers 14, one or more underlayers 16, non-magnetic or magnetic onset layers 18, a plurality of magnetic layers 20, which may or may not have spacers layers separating them. In addition, what is called the "substrate" 10 may in fact be multilayered material. In this context of proliferating layers, the RuAl seed layer can be effective in achieving the beneficial results described herein so long as it is deposited in the B2 structure and ahead of the magnetic layer. Thus, the RuAl seed layer in the preferred embodiment is intended to be the first non-amorphous layer to influence crystallographic orientation and grain size of subsequently deposited magnetic material.

In accordance with a preferred embodiment of the present invention, the CrTa or AlTi pre-seed layer 12 is sputter deposited onto the substrate (which may already have thin films on it) from targets composed substantially of (a) CrTa and preferably $CrTa_{50}$, or (b) AlTi and preferably $AlTi_{50}$. The RuAl seed layer 14 is deposited onto the pre-seed layer by standard sputtering techniques.

In accordance with a preferred embodiment of the present invention, a ferromagnetic CoCr alloy is used as an onset layer 18 between the underlayer 16 and the magnetic layer 20 because CoPtCrB magnetic alloys are difficult to grow epitaxially on Cr alloy underlayers especially with higher boron concentrations. The onset layer 18 has a Cr concentration in the range of 28–33 at. %.

Since the Cr concentration in the CoCr onset layer 18 significantly affects the magnetic properties of the disk, the Cr concentration in the CoCr onset layer is optimized in accordance with a preferred embodiment of the present invention. An addition of Cr in excess of the optimal concentration results in the impairment of SNR. On the other hand, if Cr concentration is very low, the onset layer 18 becomes magnetic in character and lowers the magnetocrystalline anisotropy (Ku) of the onset layer. Therefore, the Cr concentration of the onset layer 18 must be optimized for use with CoPtCrB magnetic layers at a concentration range of 28–33 at. % in order to obtain the best SNR performance. Since the CoCr onset layer is ferromagnetic in this concentration range, the thickness of the onset layer 18 needs to be maintained at an optimum range of 0.5 to 2.5 nm so as to achieve maximum coercivity and an improved SNR.

TABLE 3

| Onset Layer | Remanent Coercivity (Oe) | MrT (memu/cm2) | SNR at 280 kbpi (dB) |
|---|---|---|---|
| $CoCr_{37}$ | 3660 | 0.46 | 29.7 |
| $CoCr_{31}$ | 3490 | 0.45 | 30.4 |

A comparison of changes in magnetic properties observed in different onset layers with varying concentrations of Cr is presented in table 3. Both of the onset layers have a thickness of 4 nm. Table 3 illustrates coercivity and SNR results for a two-layered CoPtCrB alloy (12 nm $CoPt_{14}Cr_{20}B_8$ deposited on 12 nm $CoPt_8Cr_{20}B_8$) for two different onset layers $CoCr_{37}$ and $CoCr_{31}$.

As is seen in table 3, the $CoCr_{31}$ onset layer displays decreased coercivity and decreased MrT (Remanent magnetization times thickness) as compared to the $CoCr_{37}$ onset layer. However, an improvement in SNR is observed for the $CoCr_{31}$ onset layer as compared to the $CoCr_{37}$ onset layer.

TABLE 4

| Onset Layer Thickness (nm) | Remanent Coercivity (Oe) | MrT (memu/cm2) | SNR at 400 kbpi (dB) |
|---|---|---|---|
| 4 | 3873 | 0.32 | 23.2 |
| 2 | 4161 | 0.31 | 24.2 |

A comparison of changes in magnetic properties observed in different onset layers 18 with varying thicknesses of 2 and 4 nm is presented in table 4, which contains data for a $CoPt_8Cr_{20}B_8$ alloy using a $CoCr_{31}$ onset layer. As shown in table 4, an increase in coercivity and improved SNR is observed for the thinner onset layer. The thicker onset layer causes a decrease in magnetocrystalline anisotropy of the magnetic layer.

Figure 6:
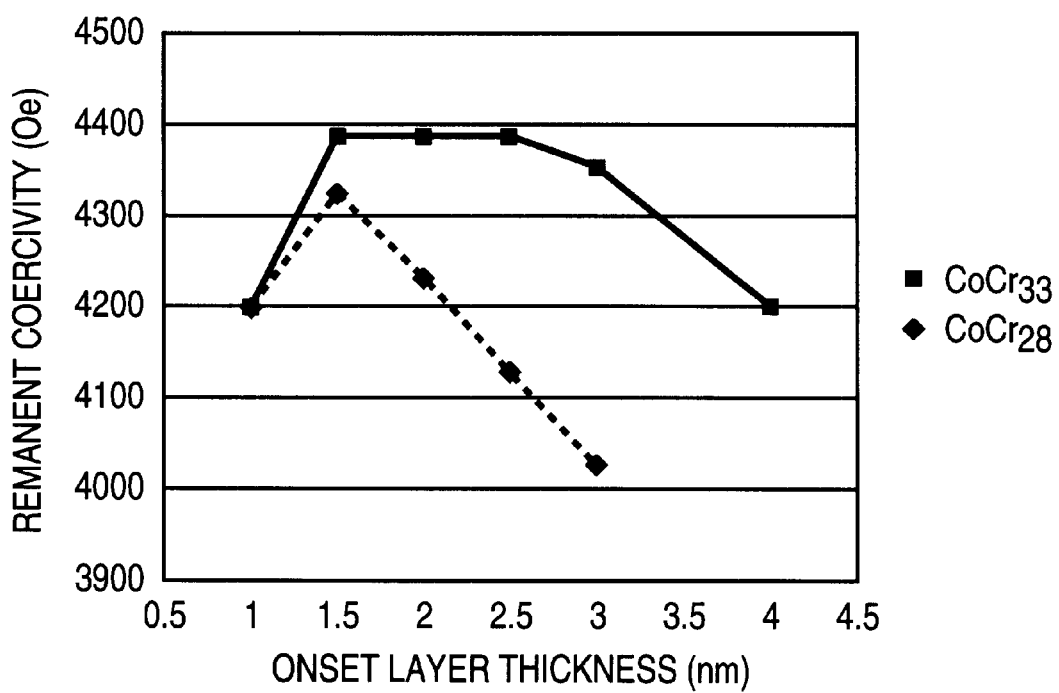
FIG. 6 is a graphical illustration showing remanent coercivity against onset layer thickness to demonstrate an optimal thickness for the onset layer.

FIG. 6 is a graphical illustration showing the changes in remanent coercivity (Hc) with varying onset layer thicknesses when the composition of the onset layer is the same. The thickness of the magnetic layer is maintained at 13 nm. As shown in FIG. 6, two onset layers with the same thickness but differing concentrations of Cr in the layer display differences in properties such as coercivity (Hc). The $CoCr_{33}$ onset layer displays a greater increase in remanent coercivity as compared to the $CoCr_{28}$ onset layer, thickness of the two layers being the same.

Additionally, remanent coercivity of a magnetic disk increases further with a reduction of thickness until a maximum coercivity (Hc) is achieved for a thinner onset layer at a thickness of approximately 1.5 nm. In accordance with a preferred embodiment of the present invention, the Cr concentration of the onset layer is maintained above 28 at. % to allow the onset layer to be thick enough to initiate growth of the Co-alloy magnetic layer without significantly degrading the Hc of the onset layer.

Figure 7:
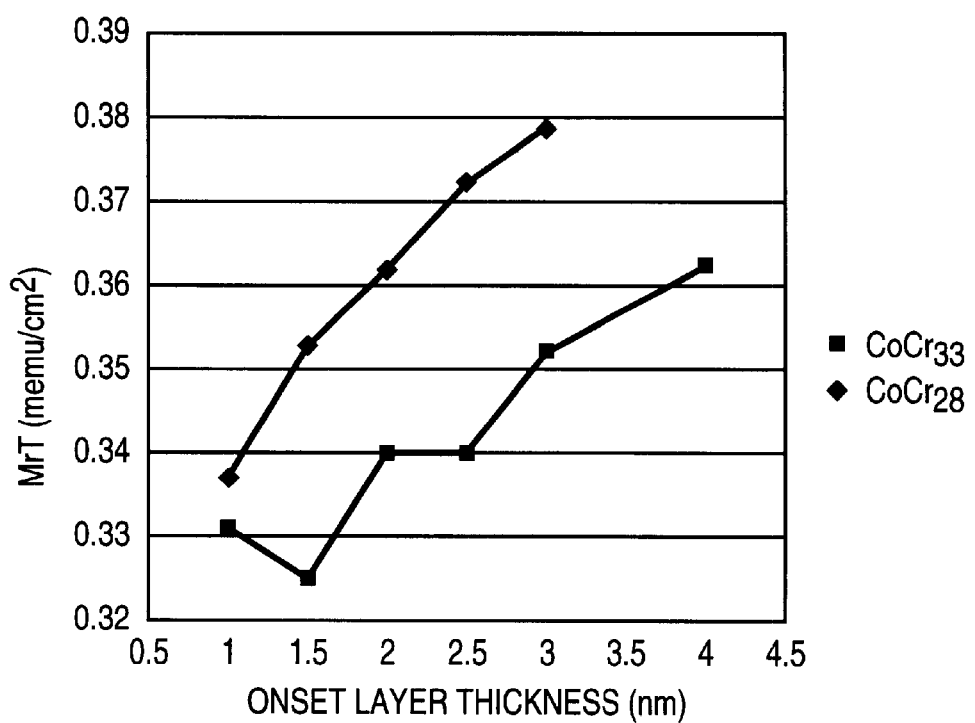
FIG. 7 is a graphical illustration showing remanent magnetization times thickness against onset layer thickness to demonstrate an optimal thickness for the onset layer.

FIG. 7 is a graphical illustration showing the changes in remanent magnetization times thickness MrT for a particular composition of the onset layer 18. The thickness of the magnetic alloy is maintained at 13 nm. As shown in FIG. 7, two onset layers of the same thickness but different Cr concentrations display differences in MrT. The $CoCr_{28}$ onset layer displays a higher increase in MrT as compared to the $CoCr_{33}$ onset layer for the same thickness.

In accordance with a preferred embodiment of the present invention, high Cr concentrations in the CoCr onset layer do not induce the best SNR performance. Likewise, a thick onset layer induces an impaired SNR performance because a thick onset layer contributes towards the magnetization which in turn results in an impaired SNR. Therefore, in accordance with a preferred embodiment of the invention, thinner onset layers 18 with thickness in the range of 0.5 to 2.5 nm and lower Cr concentration are used in the hard disk of the present invention.

While the preferred embodiments of the present invention have been illustrated in detail, it will be apparent to the one skilled in the art that alternative embodiments of the invention are realizable without deviating from the scope and spirit of the invention.

What is claimed is:

1. A thin film magnetic disk comprising:
   a substrate;
   a pre-seed layer with an amorphous or nanocrystalline structure disposed upon the substrate, said pre-seed layer being comprised of AlTi or AlTa;
   a non-magnetic ruthenium-aluminum (RuAl) seed layer deposited upon the pre-seed layer;
   a non-magnetic underlayer deposited over the RuAl seed layer;
   an onset layer deposited over the underlayer, wherein said onset layer consists essentially of CoCr and wherein the concentration of Cr is in the range of 28–33 at. %; and
   a magnet layer deposited over the onset layer.

2. The disk of claim 1, wherein the onset layer is ferromagnetic in nature.

3. The disk of claim 1, wherein the thickness of the onset layer is in the range of 0.5 to 2.5 nm.

4. The disk of claim 1, wherein the pro-seed layer is composed of a compound selected from the group consisting of CrTa or AlTi or AlTa, having a thickness between 10 nm and 60 nm;
   the RuAl seed layer has a thickness between 3 nm and 20 nm;
   the underlayer is composed of CrTi containing approximately 10 at. % Ti and has a thickness between 3 nm and 15 nm; and
   the magnetic layer is composed of a CoPtCrB alloy.

5. The disk of claim 1, wherein the pre-seed layer is AlTi and contains approximately 50 at. % Ti.

6. The disk of claim 1, wherein the pre-seed layer is AlTa and contains approximately 20 at. % Ta.

7. The disk of claim 1, wherein the thickness of the pre-seed layer is greater than or equal to 10 nm.

8. The disk of claim 1, wherein the thickness of the pre-seed layer is less than or equal to 60 nm.

9. The disk of claim 1, wherein the RuAl seed layer is between 3 and 20 nm in thickness.

10. The disk of claim 1, wherein the RuAl seed layer has a B2 structure.

11. The disk of claim 1, wherein the RuAl seed layer has a <200> preferred orientation.

12. The disk of claim 1, wherein the underlayer is a chromium alloy containing approximately 10 at. % titanium.

13. The disk of claim 1, wherein the underlayer comprises CrTi with a <200> preferred orientation.

14. The disk of claim 1, wherein the underlayer comprises CrTi and is between 3 and 15 nm in thickness.

15. The disk of claim 1, wherein the magnetic layer is comprised of a CoPtCrB alloy.

16. A disk drive comprising:
   a motor for rotating a spindle;
   a thin film magnetic disk mounted on the spindle; and
   an actuator assembly including a head for writing magnetic information on the disk as it rotates, wherein said thin film disk includes:
   a substrate;
   a pre-seed layer with an amorphous or nanocrystalline structure disposed upon the substrate, said pre-seed layer being comprised of AlTi or AlTa;
   a non-magnetic ruthenium-aluminum (RuAl) seed layer deposited upon the pre-seed layer;
   a non-magnetic underlayer deposited over the RuAl layer;
   an onset layer deposited over the underlayer, wherein said onset layer consists essentially of CoCr and wherein the concentration of Cr is in the range of 28–33 at. %; and
   a magnetic layer deposited over the onset layer.

17. The disk drive of claim 16, wherein the onset layer is ferromagnetic in nature.

18. The disk drive of claim 16, wherein thickness of the onset layer is in the range of 0.5 to 2.5 nm.

19. The disk drive of claim 16 wherein the pro-seed layer is composed of a compound selected from the group consisting of CrTa or AlTi or AlTa, having a thickness between 10 nm and 60 nm;

the RuAl seed layer has a thickness between 3 nm and 20 nm;

the underlayer is composed of CrTi containing approximately 10 at. % Ti and has a thickness between 3 nm and 15 nm; and the magnetic layer is composed of a CoPtCrB alloy.

20. The disk drive of claim 16, wherein the pre-seed layer is AlTi and contains approximately 50 at. % Ti.

21. The disk drive of claim 16, wherein the pre-seed layer is AlTa and contains approximately 20 at. % Ta.

22. The disk drive of claim 16, wherein the thickness of the pre-seed layer is greater than or equal to 10 nm.

23. The disk drive of claim 16, wherein the thickness of the pre-seed layer is less than or equal to 60 nm.

24. The disk drive of claim 16, wherein the RuAl seed layer is between 3 and 20 nm in thickness.

25. The disk drive of claim 16, wherein the RuAl seed layer has a <200> preferred orientation.

26. The disk drive of claim 16, wherein the underlayer comprises CrTi with a <200> preferred orientation.

27. The disk drive of claim 16, wherein the underlayer comprises CrTi and is between 3 and 15 nm in thickness.

28. The disk drive of claim 16, wherein the magnetic layer is comprised of a CoPtCrB alloy.

29. A method of manufacturing a thin film magnetic disk comprising the steps of:

depositing a thin film pre-seed layer with an amorphous or nanocrystalline structure onto a substrate, said pre-seed layer being comprised of AlTi or AlTa;

depositing a crystalline ruthenium-aluminum (RuAl) seed layer upon the pre-seed layer;

depositing a non-magnetic underlayer over the RuAl seed layer;

depositing an onset layer over the underlayer, wherein said onset layer consists essentially of CoCr and wherein the concentration of Cr is in the range of 28–33 at. %; and depositing a magnetic layer over the onset layer.

30. The method of claim 29, wherein the onset layer is ferromagnetic in nature.

31. The method of claim 29, wherein thickness of the onset layer is in the range of 0.5 to 2.5 nm.

32. The method of claim 29, wherein the pre-seed layer is AlTi and contains approximately 50 at. % Ti.

33. The method of claim 29, wherein the pre-seed layer is AlTa and contains approximately 20 at. % Ta.

34. The method of claim 29, wherein the thickness of the pre-seed layer is greater than or equal to 10 nm.

35. The method of claim 29, wherein the thickness of the pre-seed layer is less than or equal to 60 nm.

36. The method of claim 29, wherein the RuAl seed layer is between 3 and 20 nm in thickness.

37. The method of claim 29, wherein the RuAl seed layer has a <200> preferred orientation.

38. The method of claim 29, wherein the underlayer comprises CrTi and is between 3 and 15 nm in thickness.

39. The method of claim 29, wherein the underlayer is a chromium alloy containing approximately 10 at. % titanium.

40. The method of claim 29, wherein the underlayer comprises CrTi with a <200> preferred orientation.

41. The method of claim 29, wherein the magnetic layer is comprised of a CoPtCrB alloy.

42. The method of claim 29, wherein the pre-seed layer is composed of a compound selected from the group consisting of CrTa or AlTi or AlTa, having a thickness between 10 nm and 60 nm;

the RuAl seed layer has a thickness between 3 nm and 20 nm;

the underlayer is composed of CrTi containing approximately 10 at. % Ti and has a thickness between 3 nm and 15 nm; and the magnetic layer is composed of a CoPtCrB alloy.

\* \* \* \* \*

UNITED STATES PATENT AND TRADEMARK OFFICE
CERTIFICATE OF CORRECTION

PATENT NO. : 6,596,409 B2  
DATED : July 22, 2003  
INVENTOR(S) : Xiaoping Bian et al.

It is certified that error appears in the above-identified patent and that said Letters Patent is hereby corrected as shown below:

<u>Column 10,</u>  
Line 11, replace "pro-seed" with -- pre-seed --;  
Line 13, replace "AITa" with -- AlTa --;  
Line 66, replace "pro-seed" with -- pre-seed --;

Signed and Sealed this

Thirtieth Day of September, 2003

JAMES E. ROGAN  
*Director of the United States Patent and Trademark Office*